Figure 1:
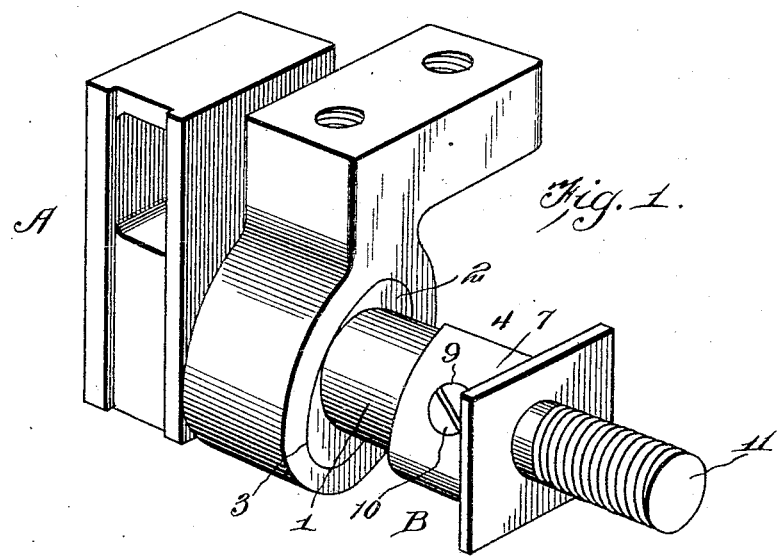

T. L. & M. J. KEARNEY.
BRUSH HOLDING STUD.
APPLICATION FILED FEB. 10, 1908.

930,864.

Patented Aug. 10, 1909.

Witnesses
Louis R. Heinrichs
C. Bradway

Inventor
Thomas L. Kearney
Michael J. Kearney

By Victor J. Evans
Attorney

UNITED STATES PATENT OFFICE.

THOMAS L. KEARNEY AND MICHAEL J. KEARNEY, OF CARBONDALE, PENNSYLVANIA.

BRUSH-HOLDING STUD.

No. 930,864.

Specification of Letters Patent.

Patented Aug. 10, 1909.

Application filed February 10, 1908. Serial No. 415,243.

*To all whom it may concern:*

Be it known that we, THOMAS L. KEARNEY and MICHAEL J. KEARNEY, citizens of the United States, residing at Carbondale, in the county of Lackawanna and State of Pennsylvania, have invented new and useful Improvements in Brush-Holding Studs, of which the following is a specification.

This invention relates to an improved stud for securing a brush-holder to its support and is designed more especially for use in railway motors, although it is to be understood that the invention is not limited in this connection but may be used with other forms of dynamo electric machines.

In railway motors, as ordinarily constructed, the brush-holders are mounted on studs that are attached to a ring or adjustable support whereby any brush-holder can be brought opposite a hand opening in the inclosing casing for the motor to enable access to any particular brush-holder or brushes in case of trouble. The studs are connected to the supporting ring in such a manner that in case of a ground or other trouble necessitating removal of a brush-holder, the entire motor has to be removed from the car to permit the repairsman to take off the brush-holder for repair or renewal. This is not only a tedious and expensive operation but requires the car to be temporarily thrown out of commission. A further objection resides in the fact that the studs, being of metal, are liable to become grounded on the metal body of the brush-holder in case of wear of the insulating bushing between them, or other causes.

The present invention has for its main object to overcome the objections above set forth by providing a stud which is comparatively simple, inexpensive and substantial construction and so designed as to permit a brush-holder to be quickly and readily removed from its support without taking down the motor and at the same time possessing the desirable feature of preventing grounding between the stud and body of the brush-holder.

A further object of the invention is the provision of a brush-holder stud which consists of a body or supporting section of insulation fitted to the brush holder, and an attaching section for securing the stud to the usual supporting ring, there being a detachable connection between the sections whereby the brush-holder and body portion of the stud can be removed together without disturbing the attaching section.

Another object of the invention is to provide a brush-holding stud made of insulating material so that danger of a ground is absolutely prevented, the stud having one extremity equipped with an attaching device suitably remote from the brush-holder so that grounding is minimized.

With these objects in view and others, as will appear as the description proceeds, the invention comprises the various novel features of construction and arrangement of parts which will be more fully described hereinafter and set forth with particularity in the claims appended hereto.

Figure 2:
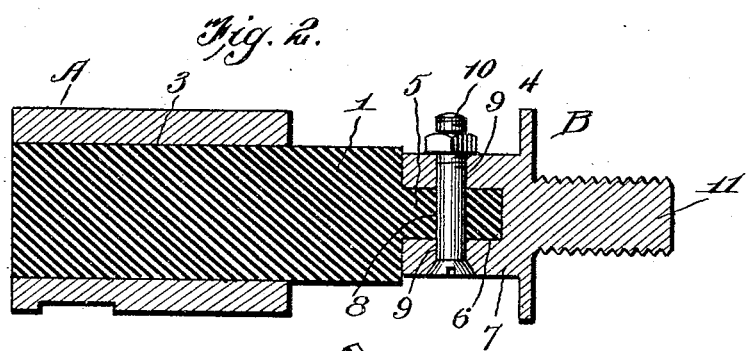
Figure 3:
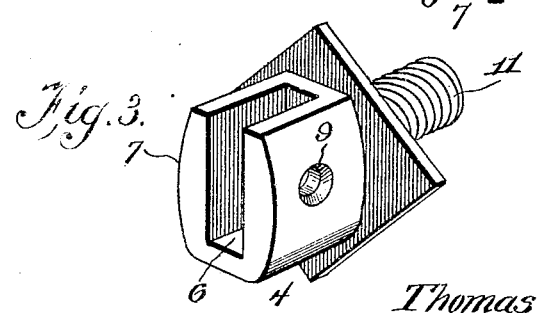

In the accompanying drawing, which illustrates one of the embodiments of the invention, Figure 1 is a perspective view of the improved stud applied to a brush-holder. Fig. 2 is a longitudinal sectional view of the stud. Fig. 3 is a perspective view of the attaching device or inner section of the stud.

Similar reference characters are employed to designate corresponding parts throughout the several views.

Referring to the drawing, A designates the body of a brush-holder of standard design, the brush and lead connector being removed, and applied to the body is the improved stud B. This stud consists of a body or supporting section 1 made of suitable insulating fiber and possessing sufficient strength to support the holder. The section 1 has an elliptical or non-circular head 2 which corresponds to the opening 3 of the holder and into which the head has a forced fit so as to prevent lateral displacement, while the particular shape of the head prevents relative turning between the holder and stud. The section 1 projects from one side of the brush-holder and on the extremity thereof is an attaching device or metal section 4, the latter being removed from the brush-holder at such a distance that danger of grounding is practically overcome. In the present instance, the section 1 is formed with a rectangular tongue 5 that snugly fits in a recess 6 formed in the head 7 of the attaching device 4, the recess being open at one side of the head for permitting the sections to be disconnected by a relative movement in a plane transverse to the axis of the stud. The tongue 5 is provided with an aperture 8 that registers with apertures 9 in the opposite walls of the head, and through these apertures extends a bolt or other fastening device 10 whereby the sections are detachably connected. Formed on the head is a threaded stud or shank 11 which is adapted to extend through an opening in the usual supporting ring for the brush-holder, the said shank receiving a nut for firmly holding the stud on the ring.

In practice, the two sections 1 and 4 of the stud are assembled on the brush-holder and supporting ring respectively, and then the parts of the stud are fitted together and secured in place by the bolt 10. After the motor is once installed and some trouble occurs to the brushes or brush-holder, it is an extremely simple matter to remove the brush-holder without dismantling or taking down the motor, it being merely necessary to remove the bolt 10 and lift out the brush holder with the section 1 of the stud attached thereto. The replacing of the brush-holder is as readily accomplished so that great time and expense can be saved and trouble reduced to a minimum.

From the foregoing description, taken in connection with the accompanying drawing, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims.

Having thus described the invention, what we claim is:—

1. A brush-holder stud of insulation formed with a flat tongue at one end, an attaching device having a recess into which the tongue is fitted, and a fastening passing through the device and tongue for removably securing the parts together.

2. The combination of a brush holder, a stud of insulation secured thereto and having a portion projecting from one side of the brush holder and having a tongue extending longitudinally from the projecting portion, and an attaching device provided with a recess shaped to correspond with the tongue and into which the tongue is fitted, said tongue being of greater transverse dimension in one direction than in another direction for preventing turning in the socket.

3. The combination of a brush holder having an opening of greater transverse dimension in one direction than in another, a stud of insulation of corresponding cross-sectional dimensions with the opening to snugly fit therein, an attaching device removably secured to one end of the stud, and a bolt passing through the stud and device for fastening the parts together.

4. A brush-holder stud of insulation formed with an eccentric portion extremity at one end and a rectangular tongue at the other end, a metallic attaching means consisting of a head provided with a rectangular recess open at the end and side of the head for receiving the tongue, a fastening for securing the tongue in the recess, and a threaded shank on the attaching means.

In testimony whereof we affix our signatures in presence of two witnesses.

THOMAS L. KEARNEY.
MICHAEL J. KEARNEY.

Witnesses:
 JOHN L. FLETCHER,
 C. BRADWAY.